United States Patent [19]

Yamaoka et al.

[11] Patent Number: 5,440,488
[45] Date of Patent: Aug. 8, 1995

[54] SYSTEM FOR CONTROLLING DAMPING FORCE CHARACTERISTIC OF SHOCK ABSORBER OF VEHICLE

[75] Inventors: Fumiyuki Yamaoka; Mitsuo Sasaki, both of Atsugi, Japan

[73] Assignee: Unisia Jecs Corporation, Japan

[21] Appl. No.: 120,404

[22] Filed: Sep. 14, 1993

[30] Foreign Application Priority Data

Sep. 16, 1992 [JP] Japan ................... 4-246109

[51] Int. Cl.⁶ .......................................... B60G 17/015
[52] U.S. Cl. ................... 364/424.05; 280/707
[58] Field of Search ................... 364/424.05; 280/707, 280/840

[56] References Cited

U.S. PATENT DOCUMENTS

| | | | |
|---|---|---|---|
| 4,853,860 | 8/1989 | Achenbach | 280/707 |
| 4,930,082 | 5/1990 | Harara et al. | 364/424.05 |
| 5,060,157 | 10/1991 | Tado et al. | 280/707 |
| 5,138,554 | 8/1992 | Wada | 364/424.05 |
| 5,172,929 | 12/1992 | Butsuen et al. | 280/707 |
| 5,295,074 | 3/1994 | Williams | 364/424.05 |

FOREIGN PATENT DOCUMENTS

| | | |
|---|---|---|
| 0227343 | 7/1987 | European Pat. Off. . |
| 0235695 | 9/1987 | European Pat. Off. . |
| 4135525 | 4/1992 | Germany . |
| 4236805 | 5/1993 | Germany . |
| 61-163011 | 7/1986 | Japan . |

*Primary Examiner*—Gary Chin
*Attorney, Agent, or Firm*—Ronald P. Kananen

[57] ABSTRACT

A system for controlling damping force characteristics for respective shock absorbers, each shock absorber being interposed between a sprung mass and an unsprung mass, in which a control signal to control the damping force characteristic at either or both stroke sides of each shock absorber is derived by a control unit on the basis of a signal indicating a sprung mass behavior, a signal indicating a steering angular displacement of a vehicle steering system, and a signal indicating a steering angular velocity of the steering system. In addition, a control equation to determine the control signal value has various coefficients which are zeroed depending on whether a predetermined steering condition is established.

7 Claims, 12 Drawing Sheets

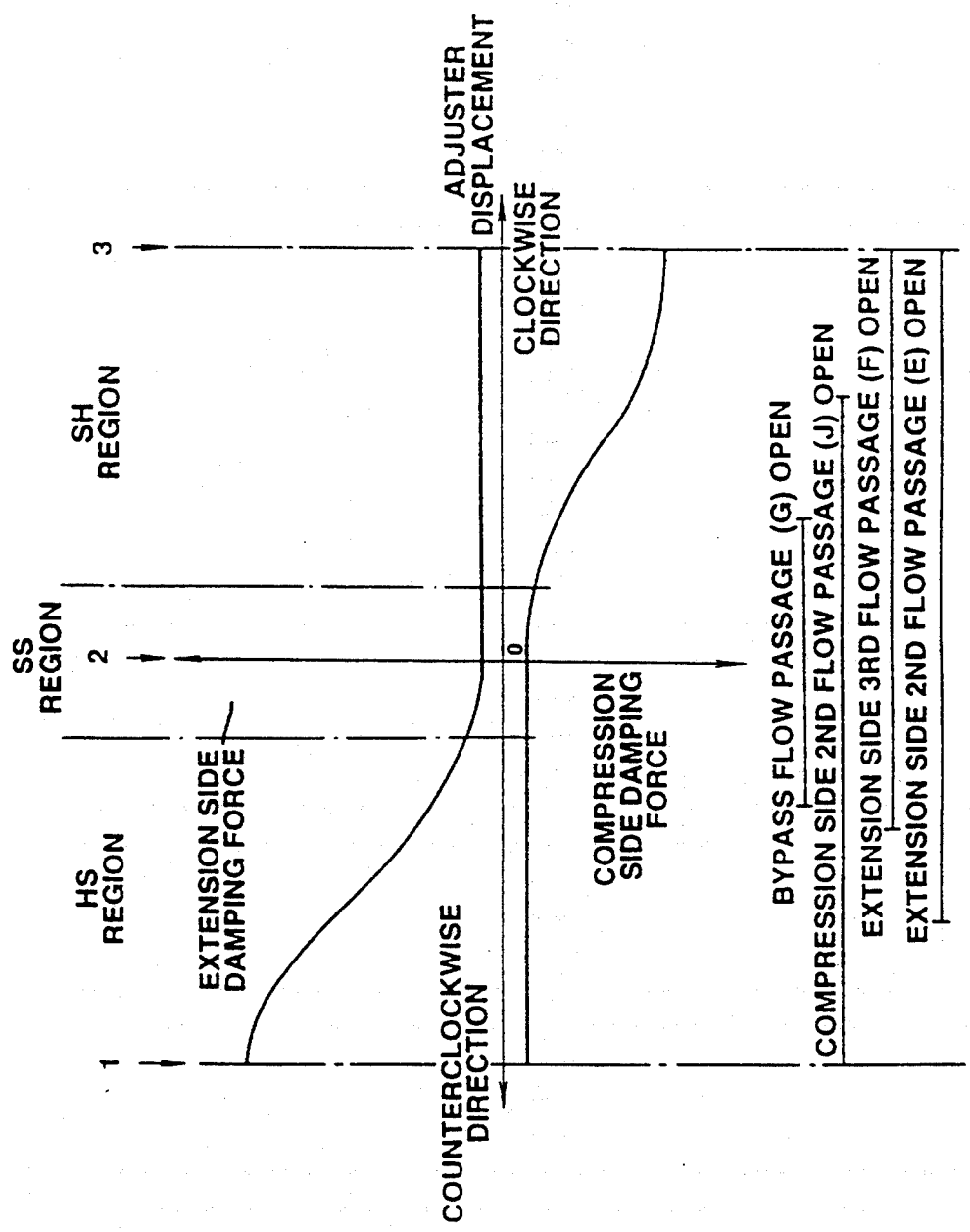

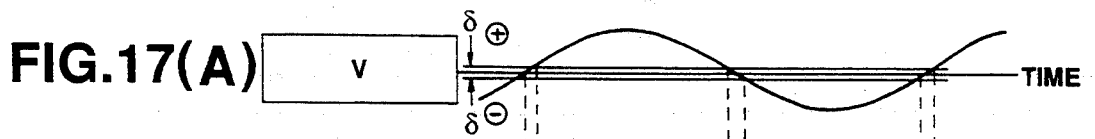
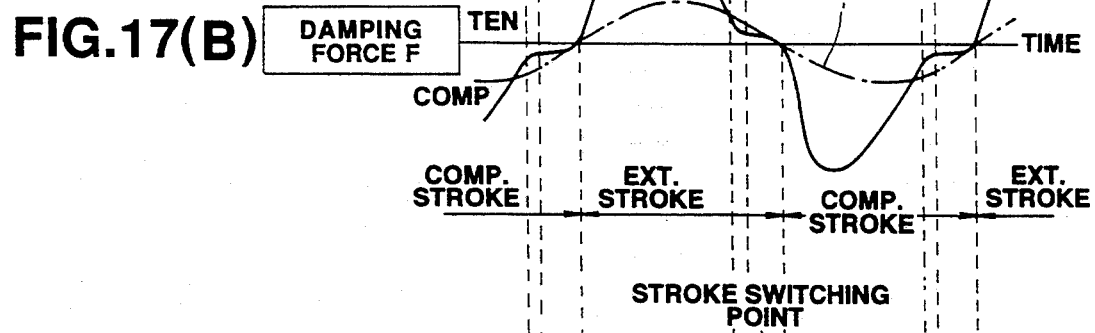
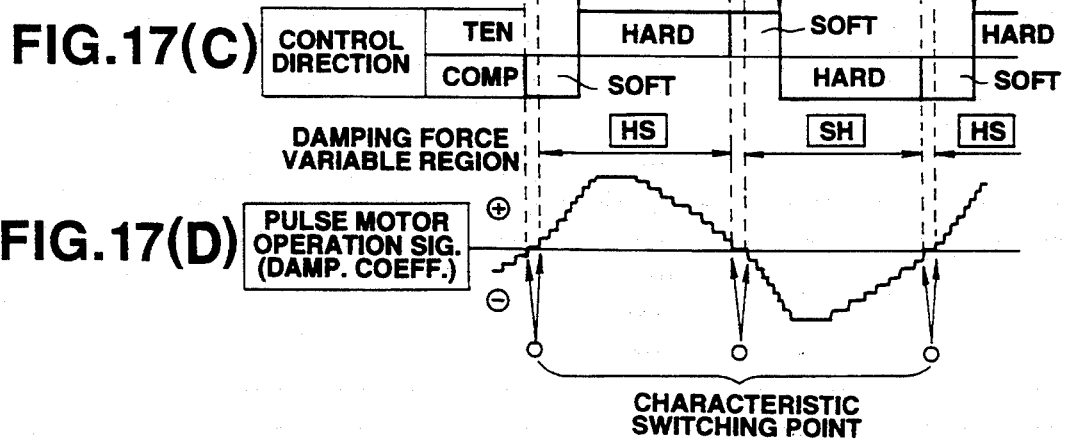

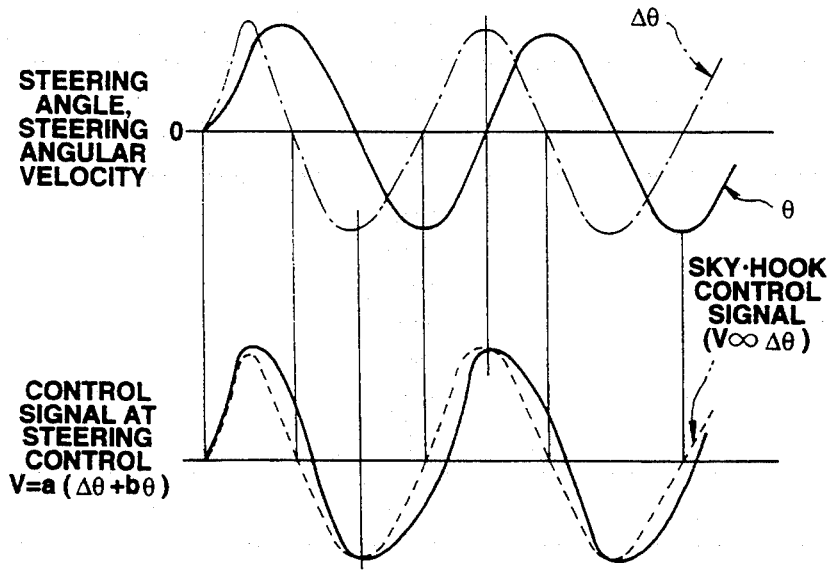

FIG.18(A) STEERING ANGLE, STEERING ANGULAR VELOCITY

FIG.18(B) CONTROL SIGNAL AT STEERING CONTROL $V=a(\Delta\theta+b\theta)$

SKY-HOOK CONTROL SIGNAL ($V\propto\Delta\theta$)

FIG.19

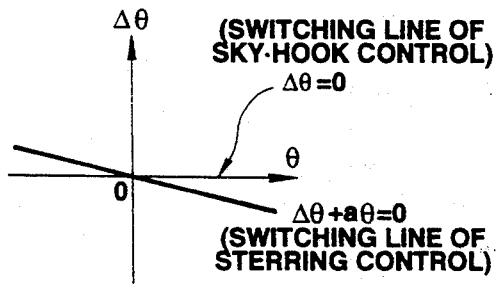

(SWITCHING LINE OF SKY-HOOK CONTROL) $\Delta\theta=0$ $\Delta\theta+a\theta=0$ (SWITCHING LINE OF STERRING CONTROL)

FIG.20

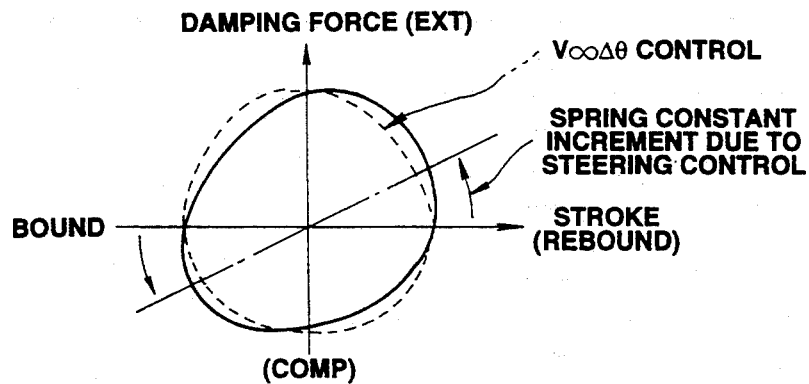

DAMPING FORCE (EXT)
$V\propto\Delta\theta$ CONTROL
SPRING CONSTANT INCREMENT DUE TO STEERING CONTROL
STROKE (REBOUND)
BOUND
(COMP)

SYSTEM FOR CONTROLLING DAMPING FORCE CHARACTERISTIC OF SHOCK ABSORBER OF VEHICLE

BACKGROUND OF THE INVENTION:

1. Field of The Invention

The present invention relates generally to a system for controlling damping force characteristics of respective shock absorbers of a vehicle, each shock absorber (also called a damper, but hereinafter referred to as the shock absorber) being interposed between an unsprung mass and sprung mass of the vehicle so as to provide an optimum damping force therefrom. The shock absorber is provided with changing means for changing the damping coefficient thereof at multiple stages in response to a drive signal.

2. Description of The Background Art

A Japanese Patent Application First Publication No. Showa 61-163011 exemplifies a previously proposed damping characteristic controlling system for a vehicle.

In the disclosed Japanese Patent Application First Publication, a relative velocity between sprung mass (vehicle body) and unsprung mass (tire wheel) is detected. When both velocities have mutually the same sign, the characteristic of the damping force for one shock absorber is set to have a hard characteristic. When both velocities have the different signs, the characteristic of the damping force for the one shock absorber is set to have a soft characteristic. The setting operations are based on the damping force characteristic control called "Sky Hook" theory and carried out independently for each of the four tire wheels.

Thus, an application energy to be transmitted to the vehicle body can be reduced and, at the same time, an energy to damp the vibration can be increased. Consequently, vibrations occurring on the vehicle body can be suppressed and a highly improved vehicle comfort can be achieved. In addition, such phenomena as squat and/or dive can be suppressed and steering stability of the vehicle can be improved.

However, since when, in the suspension control system disclosed in the above-identified Japanese Patent Application First Publication, a control gain is determined such that the vibration energy transmission from a road surface to the vehicle body (sprung mass) is suppressed, while assuring the characteristic to control vibration damping, a rolling occurs on the sprung mass due to the application of inertia force to the sprung mass during the vehicular steering operation and a control force becomes insufficient by the inertia force so that a sufficient effect of damping the vibration on the sprung mass cannot be achieved.

SUMMARY OF THE INVENTION

It is, therefore, a principal object of the present invention to provide an improved system for controlling damping characteristics for respective shock absorbers which can assure the characteristic to damping the vibration on the sprung mass, suppressing the vibration transmission toward the sprung mass and can provide a sufficient control force to the shock absorber(s) when an inertia force is applied so as to generate a rolling motion at the vehicle.

The above-described object can be achieved by providing a system for controlling damping forces for respective shock absorbers of a vehicle, comprising: a) a plurality of shock absorbers, each shock absorber being interposed between a sprung mass and unsprung mass of the vehicle; b) first means for varying a damping force characteristic of at least one side of a piston stroke of each shock absorber in response to a control signal; c) second means for detecting a behavior of the sprung mass of the vehicle; d) third means for detecting a steering angular displacement and a steering angular velocity of a vehicular steering system; and e) fourth means for receiving a first signal indicating the steering angular displacement and a second signal indicating the steering angular velocity from third means and a third signal indicating the sprung mass behavior detected by second means and producing the control signal derived using values of the first, second, and third signals, control signal being transmitted to first means so that the damping force characteristic of each shock absorber is controlled according to the control signal.

BRIEF DESCRIPTION OF THE DRAWINGS

FIG. 6 is a characteristic graph of a damping force with respect to a displacement direction of a stepping motor, connected to each shock absorber shown in FIGS. 2 to 5 used in the preferred embodiment.

FIGS. 17 (A), 17 (B), 17 (C), and 17 (D) are an integrally illustrated timing chart indicating operations when the steering condition is not established in the damping force controlling system shown in FIG. 2.

FIGS. 18 (A) and 18 (B) are an integrally illustrated timing chart for explaining the operations when the steering condition is established.

FIG. 19 is a characteristic graph of switching lines when the control during the steering operation is carried out.

FIG. 20 is a characteristic graph indicating a resurging waveform of the damping force in the case where the control during the steering operation is carried out in the preferred embodiment of the damping force controlling system.

DESCRIPTION OF THE PREFERRED EMBODIMENT

Reference will, hereinafter, be made to the drawings in order to facilitate a better understanding of the present invention.

Figure 1:
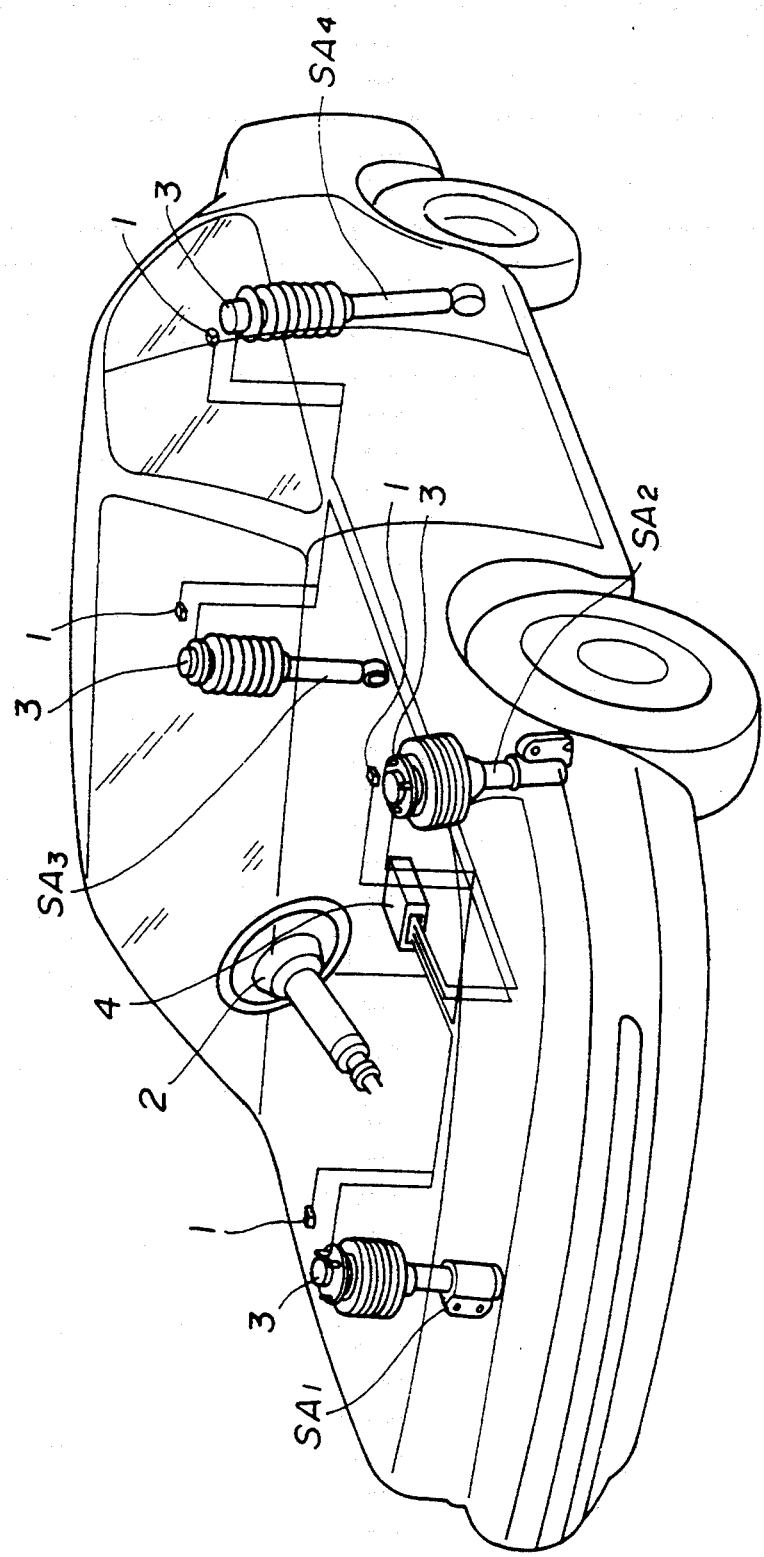
FIG. 1 is a schematic perspective view of a vehicle to which a system for controlling damping characteristics for the respective shock absorbers according to the present invention is applicable.

FIG. 1 shows a structure of a system for controlling damping forces for respective shock absorbers in a preferred embodiment according to the present invention.

Four shock absorbers (suspension units) $SA_1$, $SA_2$, $SA_3$, and $SA_4$ are interposed between respective parts of a vehicle body and respective tire wheels. It is noted that SA denotes simply a representative shock absorber commonly used when each shock absorber is explained.

On a part of the vehicle body provided in the proximity to each shock absorber SA, sprung mass vertical acceleration sensor 1 (also called, G sensor) which serves to detect a vertical acceleration is installed. A steering sensor 2 is disposed on a steering system of the vehicle to detect a steering angle by which the vehicle driver operates a steering wheel.

A control unit 4 is installed on a part of the vehicle body which is placed in a proximity to a driver's seat and which receives an output signal of each G sensor 1 and steering angle sensor 2 and produces a drive control signal to a stepping motor (also called, pulse motor) 3 connected to each shock absorber SA.

Figure 2:
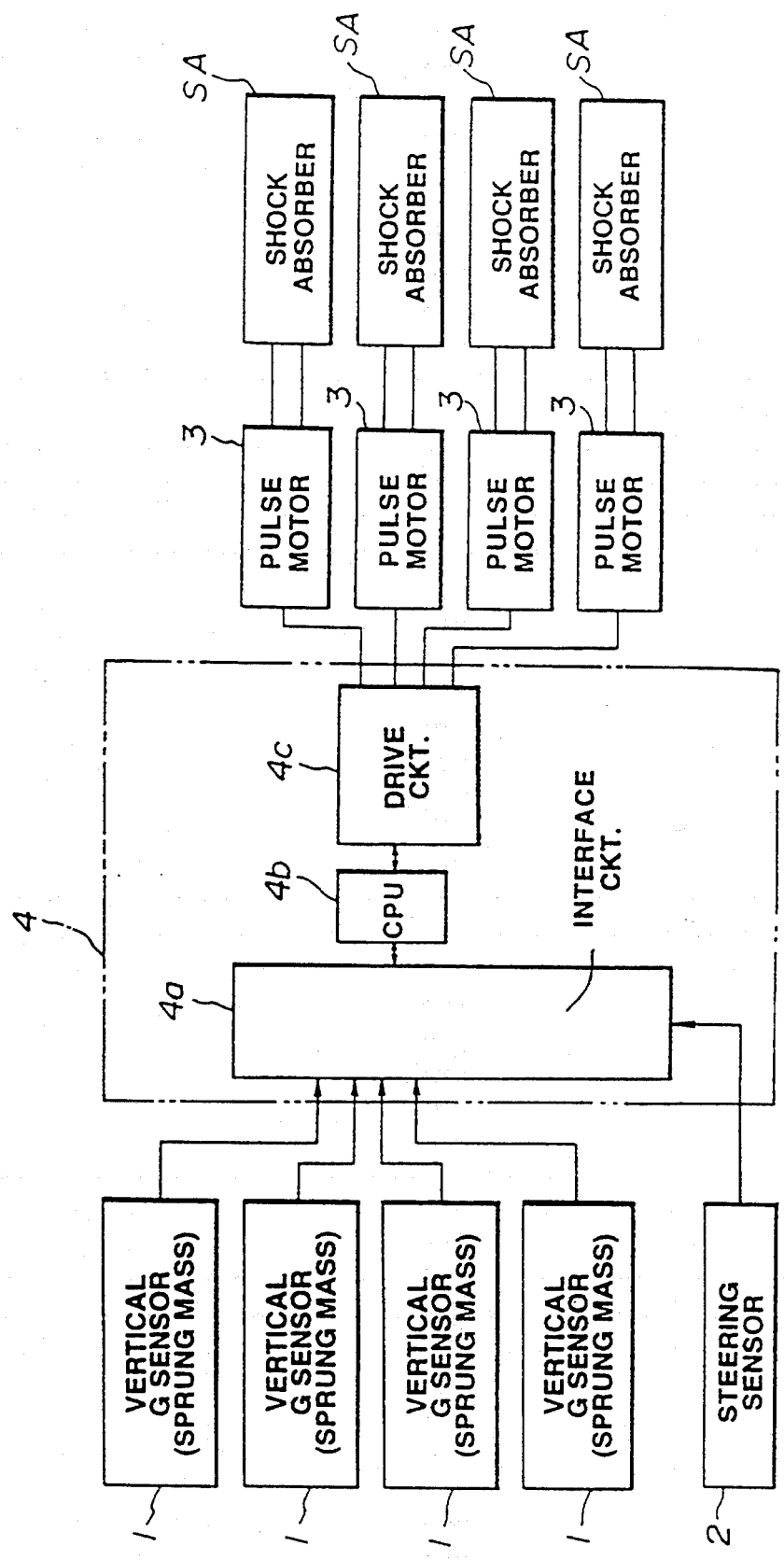
FIG. 2 is a schematic circuit block diagram of a preferred embodiment of the system for controlling damping coefficients for the respective shock absorbers.

FIG. 2 shows a circuit block diagram of the damping force controlling system shown in FIG. 1.

The control unit 4 includes, as shown in FIG. 2, an interface circuit 4a, CPU 4b, and a drive circuit 4c. The interface circuit 4a receives signals derived from the respective G sensors 1 and steering angle sensor 2.

Figure 3:
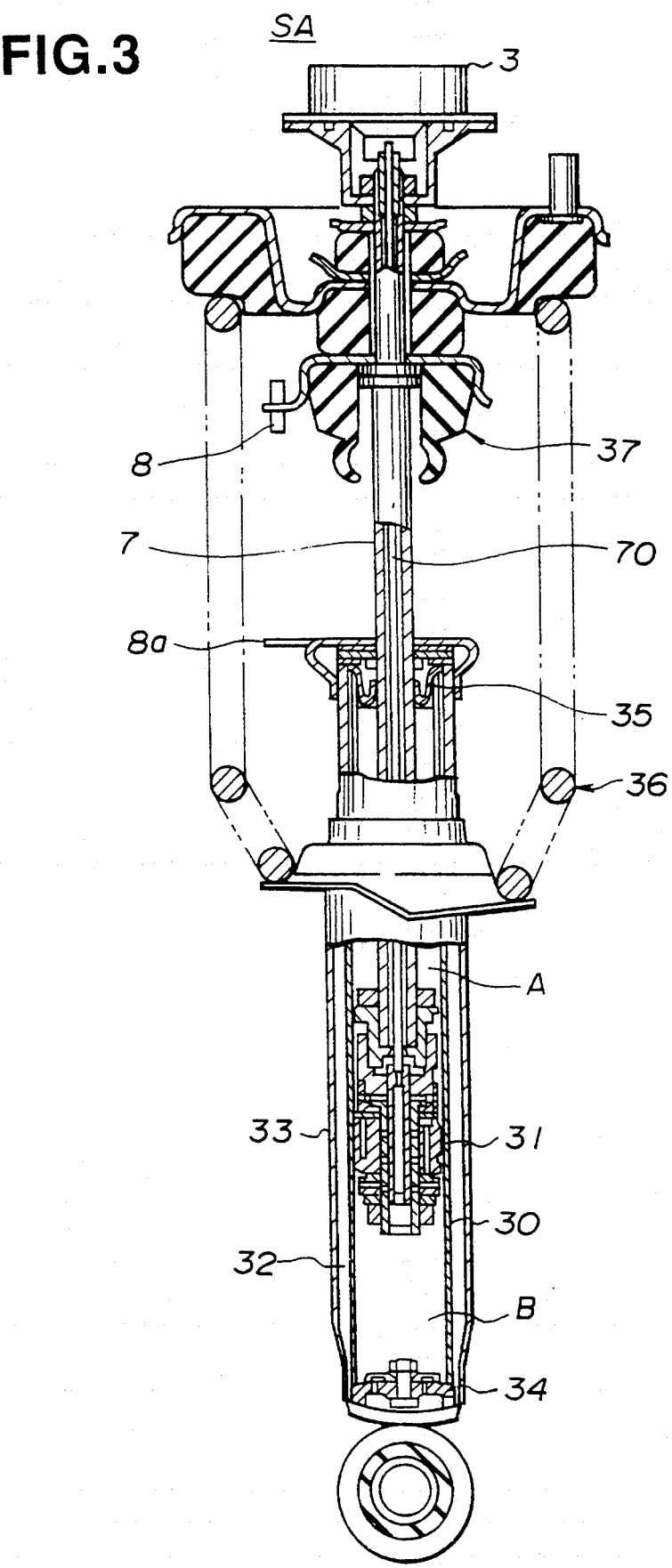
FIG. 3 is a cross sectional view of one of the shock absorbers used in the preferred embodiment according to the present invention.

FIG. 3 shows a cross sectional view of each shock absorber SA. The shock absorber SA includes a cylinder 30, a piston 31 defining two chambers, upper chamber A and lower chamber B, an outer envelope 33 which forms a reserve chamber 32 on an outer periphery of the cylinder 30, a base 34 defining the lower chamber B and reserve chamber 32, a guide member 35 which serves as a guide for a slide motion of a piston rod 7 linked to the piston main body 31, a suspension spring 36 interposed between the outer envelope 33 and vehicle body, and a bumper rubber 37.

In FIG. 3, a control rod 70 is penetrated through the piston rod 7 and is rotated (pivoted) by means of the pulse motor 3.

Figure 4:
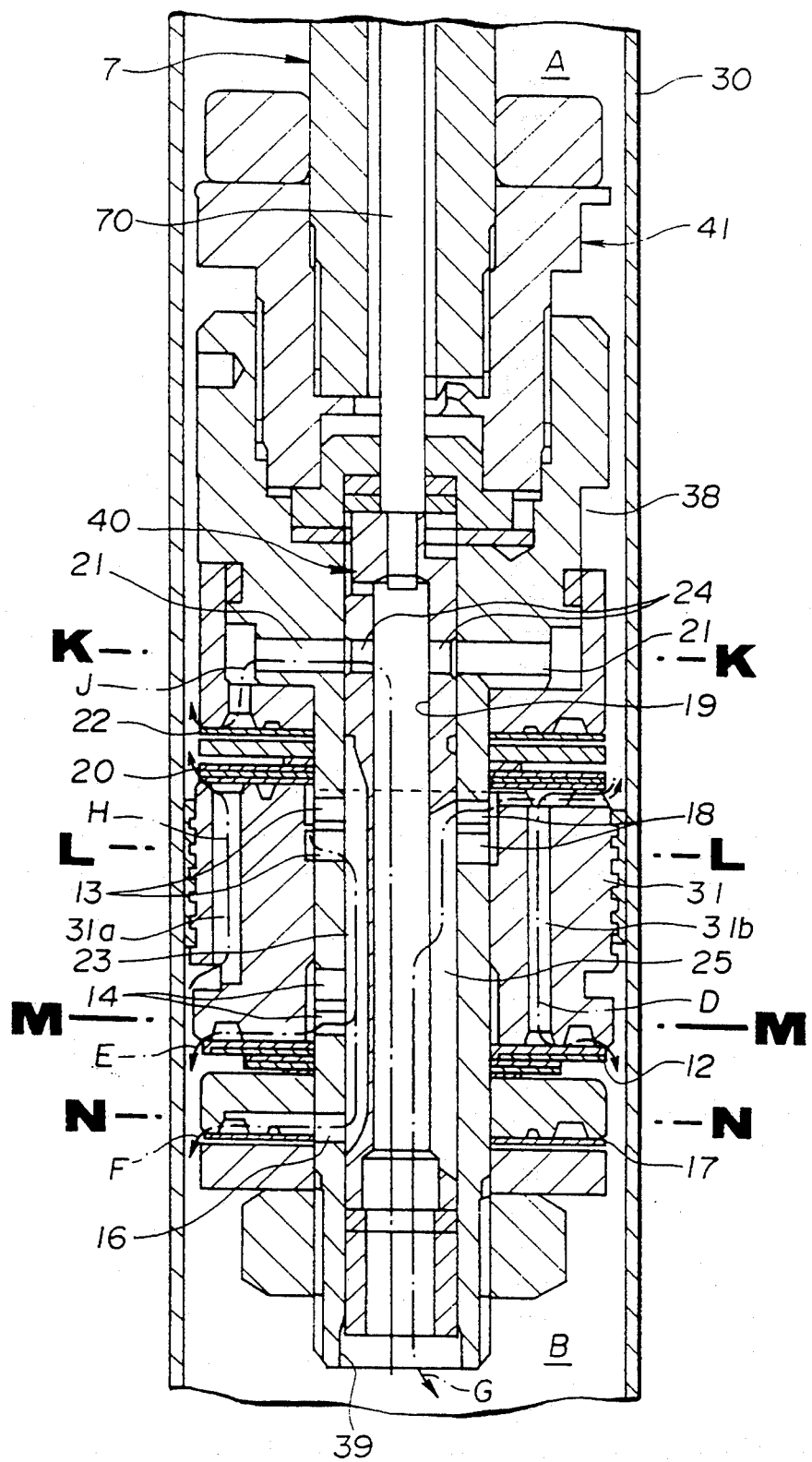
FIG. 4 is an enlarged cross sectional view of a piston and its surrounding members of each shock absorber.

FIG. 4 shows an enlarged cross sectional view of an essential part of the piston 31.

As shown in FIG. 4, two penetrating holes 31a, 31b are formed in the piston 31 and extension stroke side damping valve 12 and compression stroke side damping valve 20 are installed which open and close the corresponding penetrating holes 31a, 31b, respectively. A bounding stopper 41 spirally engaged to a tip of the piston rod 7 is fixed with a stud 38 in the spiral engagement which is penetrated through the piston 31. A communication hole 39 is formed on the stud 38 to form flow passages to communicate a working fluid between the upper chamber A and lower chamber B (extension stroke side second flow passage E, extension stroke side third flow passage F, a bypass passage G, and compression stroke side second flow passage J, as will be described later). An adjuster 40 which serves to vary a flow passage cross sectional area is pivotally installed within the communication hole 39. An extension stroke side cheek valve 17 and a compression stroke side check valve 22 are installed on the outer periphery of the stud 38 which enable and interrupt the flow pass at the flow passage formed with the communication hole 39 according to a direction of flow communication of the working fluid.

It is noted that the control rod 70 is linked to the adjuster 40. The stud 38 is formed with first port 21, second port 13, third port 18, fourth port 14, and a fifth port 16 in the upper positional order.

On the other hand, a hollow portion 19 is formed in the adjuster 40, a first lateral hole 24 and second lateral hole 25 being formed therein. A longitudinal groove 23 is formed on an outer periphery of the adjuster 40.

The flow passages through which the working fluid can be communicated between the upper chamber A and lower chamber B at the time of the extension stoke of the piston 31 include: a) an extension stroke side first flow passage D which is provided to pass the working fluid through the penetrating hole 31b and internal side of the opened valve of the extension stroke side damping valve 12 to the lower chamber B; b) the extension stroke side second flow passage E which passes through the second port 13, longitudinal groove 23, and fourth port 14 and which passes through an outer periphery of the opened valve of the extension stroke side damping valve 12; c) the compression stroke side third flow passage F which passes through the second port 13, longitudinal groove 23, and fifth port 16 and the opened valve of the extension stroke side check valve 17 and extended toward the lower chamber B; and d) the bypass passage G which passes through the third port 18, second lateral hole 25, and hollow portion 19.

On the other hand, the flow passages through which the working fluid can be communicated between the upper chamber A and lower chamber B at the time of the compression stroke side of the piston 31 includes: a) the compression stroke side first flow passage H which passes through the penetrating hole 31a and the opened valve of the compression stroke side damping valve 20; b) the compression stroke side second flow passage J which passes through the hollow portion 19, first lateral hole 24, and first port and the opened valve of the compression stroke side check valve 22 toward the upper chamber A; and c) the bypass passage G which passes through the hollow portion 19, second lateral hole 25, and third port 18 toward the upper chamber A.

That is to say, the shock absorber SA has the damping force characteristic such that the characteristic of the damping force is changeable from a low damping force (soft) to a high damping force (hard) at either of the extension and compression stroke sides in response to a pivotal motion of the adjuster 40.

Figure 5:
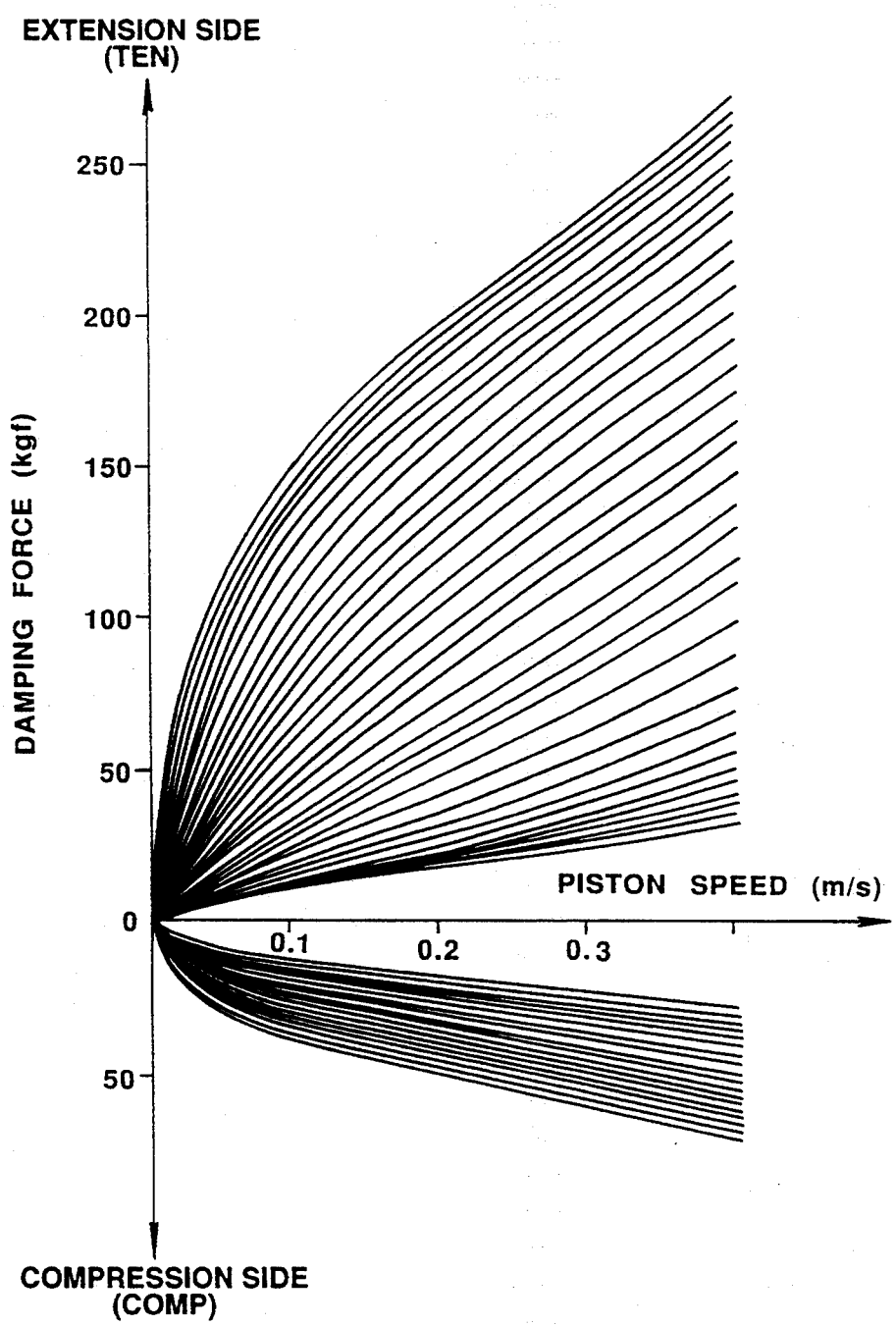
FIG. 5 is a characteristic graph of damping force at both extension stroke side and compression stroke side of the piston of each shock absorber used in the preferred embodiment shown in FIGS. 2 to 4.

In the embodiment, since the damping force characteristic is so structured as to enable it to be proportionally changed at multiple stages as shown in FIG. 5. Such a characteristic as shown in FIG. 5 is also called damping coefficient.

As shown in FIG. 6, when the adjuster 40 is pivoted in a counterclockwise direction from a position at which both extension and compression stroke sides provide soft damping forces(hereinafter, referred to as so the soft characteristic SS), only the damping force at the extension stroke side can be varied at the multiple stage and the compression stroke side is fixed at the low damping coefficient value (Hereinafter, called the extension stroke side hard characteristic HS).

On the contrary, if the adjuster 40 is pivoted in a clockwise direction, only the compression stroke side provides the multiple stage of damping coefficients but the extension stroke side is fixed to the low damping coefficient (hereinafter, referred to as the compression stroke side hard characteristic SH).

Figure 7A:
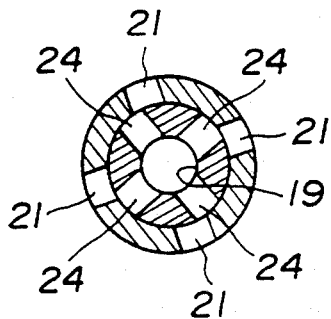
FIGS. 7 (A) through 7 (C) are cross sectional views cut away along a line K—K shown in FIG. 4.
Figure 7B:
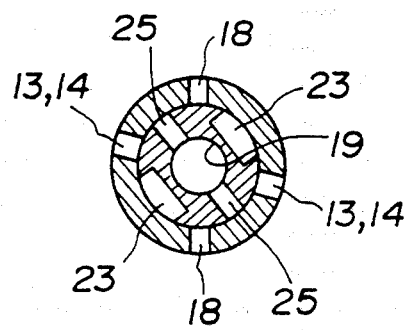
Figure 7C:
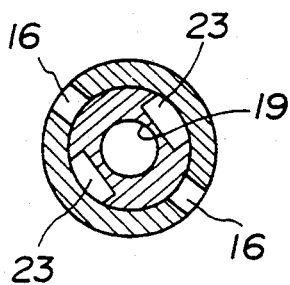
Figure 8A:
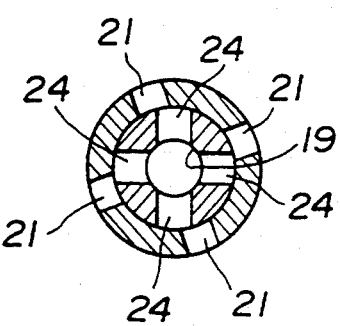
FIGS. 8 (A) through 8 (C) are cross sectional views cut away along a line L—L and a line M—M shown in FIG. 4.
Figure 8B:
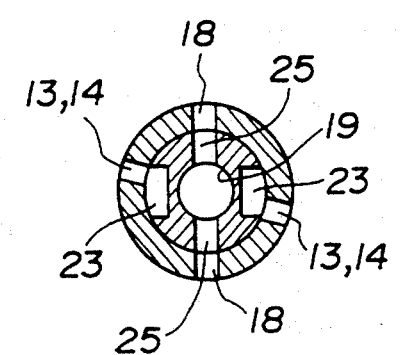
Figure 8C:
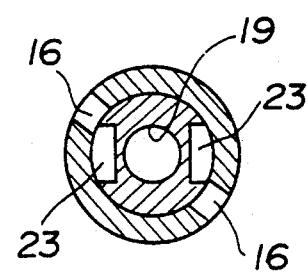
Figure 9A:
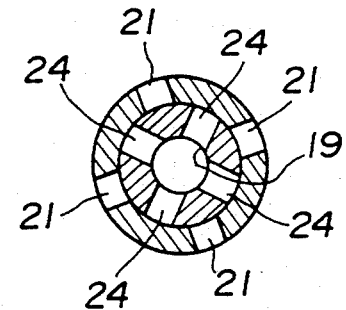
FIG. 9 (A) through 9 (C) are cross sectional views cut away along a line N—N shown in FIG. 4.
Figure 9B:
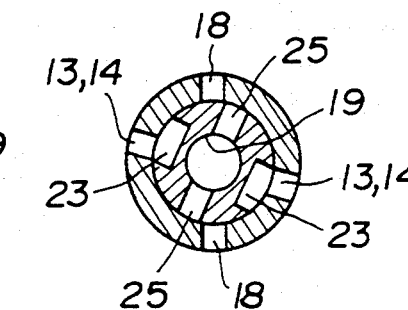
Figure 9C:
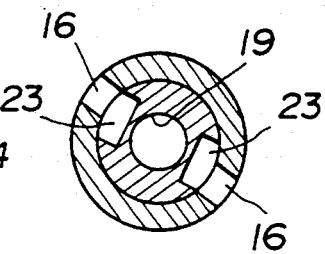

In FIG. 6, when the adjuster 40 is positioned at pivoted positions of ①, ②, and ③, the cross section of the piston cut away along the line K—K are shown in FIGS. 7 (A), 7 (B), and 7 (C) respectively; those along the lines L—L and M—M are shown in FIGS. 8 (A) through 8 (C), respectively; and those along the line N—N are shown in FIGS. 9 (A) through 9 (C), respectively.

Figure 10:
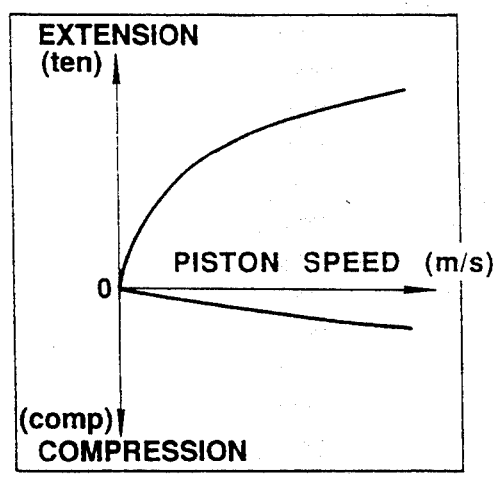
FIG. 10 is a characteristic graph of damping force when the damping characteristic at the extension stroke side of each shock absorber shown in FIG. 4 is set to a hard.
Figure 11:
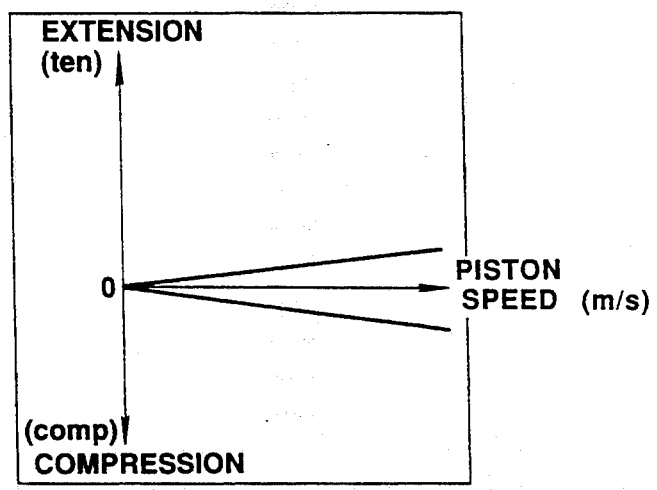
FIG. 11 is a characteristic graph of damping force when the damping characteristics at both extension and compression stroke sides are set to a soft.
Figure 12:
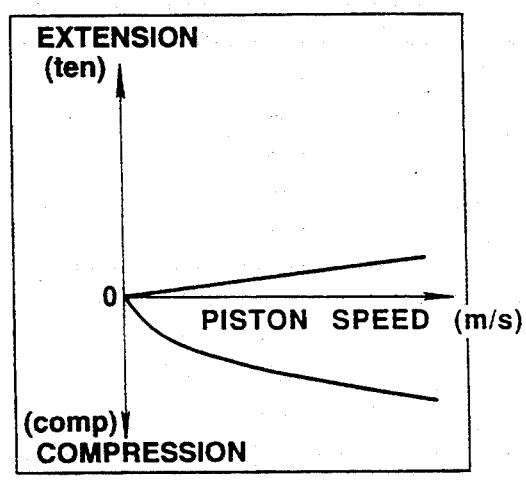
FIG. 12 is a characteristic graph of damping force when the damping characteristic at the compression stroke side is set to a hard.

FIGS. 10, 11, and 12 show characteristics of the damping forces at the respective positions of ①②, and ③.

Figure 13:
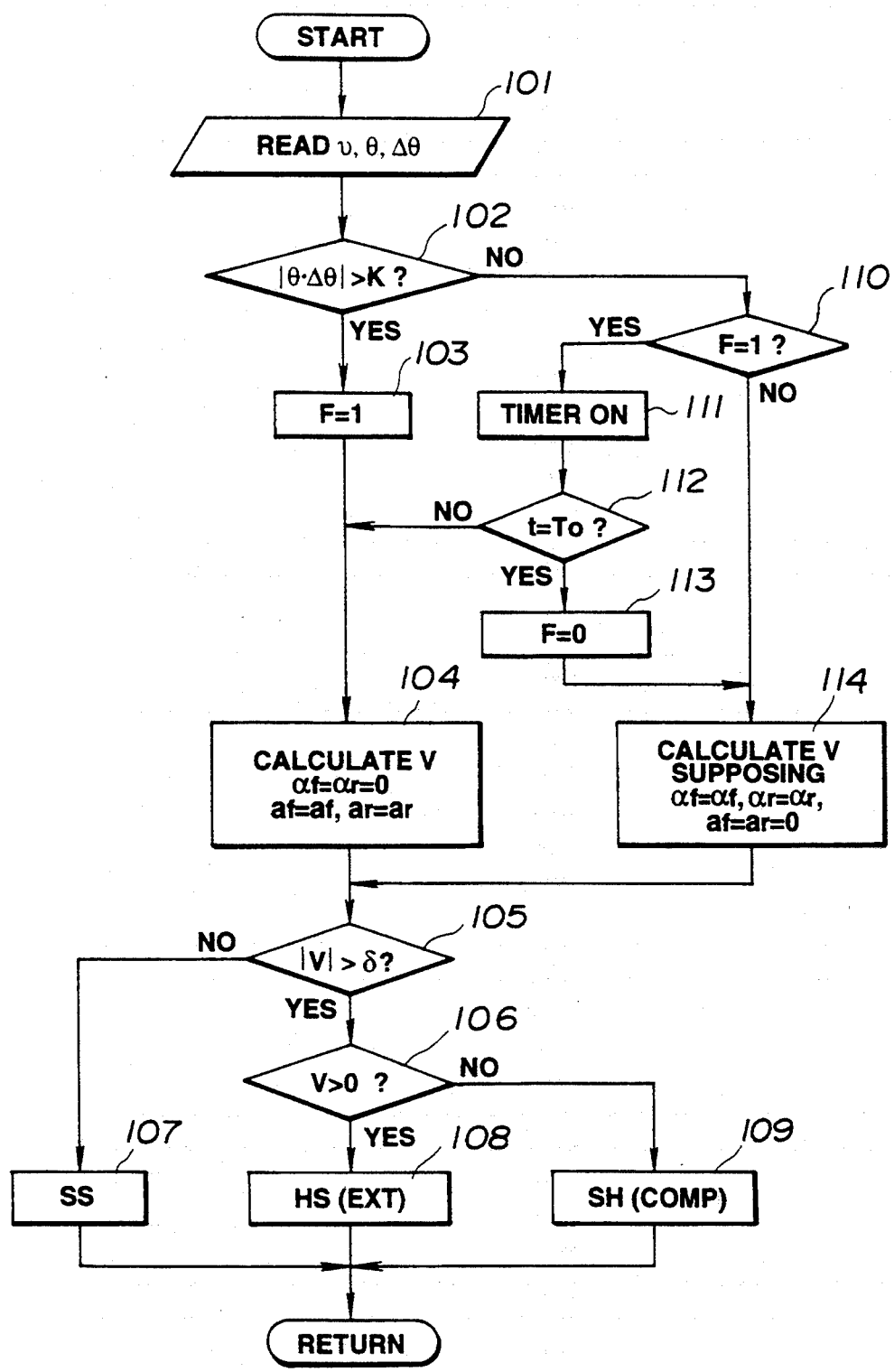
FIG. 13 is an operational flowchart executed in a control unit shown in FIG. 2.

FIG. 13 shows an operational flowchart executed by the control unit 4 which controls the drive of the pulse motor 3. It is noted that the program routine shown in FIG. 13 is executed for each shock absorber, independently.

Figure 14:
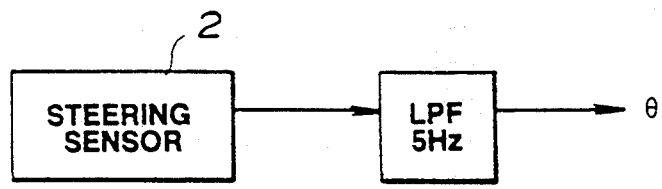
FIG. 14 is a circuit block diagram of an essential circuit of the damping coefficient controlling system shown in FIG. 2.
Figure 15:
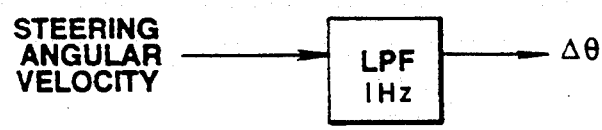
FIG. 15 is a circuit block diagram of an essential circuit of the damping coefficient controlling system shown in FIG. 2.

Referring to FIG. 13, at a step 101, the CPU 4b reads velocity v derived by processing a signal from each G sensor 1, a steering angular displacement $\theta$, and a steering angular velocity $\Delta\theta$ derived by processing a signal from the steering angle sensor 2. It is noted that the steering angular displacement (steering angle) $\theta$ is derived such that, as shown in FIG. 14, the signal derived from the steering angle sensor 1 is passed through a low pass filter (LPF) having a cut off frequency of 5 Hz so as to eliminate noises of high frequency components. It is also noted that the steering angular velocity $\Delta\theta$ is derived such that, as shown in FIG. 15, a rate of change in the steering angular displacement derived according to a change in the number of pulses per unit of time of the signal from the steering angle sensor 1 is passed through a low pass filter (LPF) having a cut off frequency of 1 Hz.

At a step 102, the CPU 4b determines whether a steering condition is established.

Figure 16:
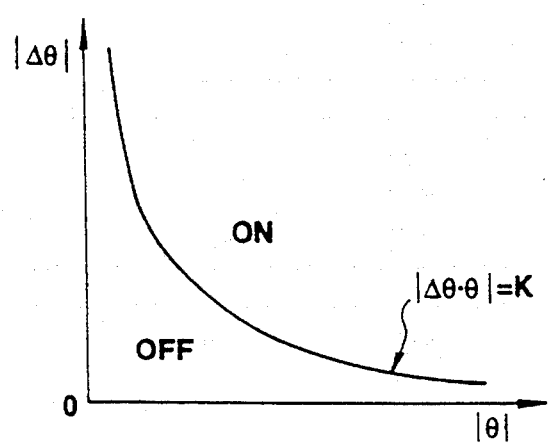
FIG. 16 is a map to determine establishment or nonestablishment of a steering condition in the damping force controlling system shown in FIG. 2.

That is to say, at the step 102, the CPU 4b determines whether an absolute value of ($\theta\cdot\Delta\theta$) is larger than a predetermined value K. If Yes at the step 102, the routine goes to a step 103 and, if No at the step 110, the routine goes to a step 110. FIG. 16 shows a map representing a first region in which the steering condition is established (ON) and a second region in which the steering condition is not established (OFF).

At a step 103, the CPU 4b executes a step wherein the flag F is set to 1.

At a step 104, the CPU 4b calculates a control signal V for each shock absorber SA. If the steering condition (ON) is established, coefficients in a control equation are set as follows: $a_f=a_r=0$, $a_f=a_f$, and $a_r=a_r$.

Control Equation $$V_{FR}=a_f(v_1+\beta_f v_1 \cdot v_p + \tau_f V_1 + \tau_f v_1 \cdot v_R) + a_f(\Delta\theta + b_f\theta);$$

$$V_{FL}=a_f(v_2+\beta_f v_2 \cdot v_p - \tau_f v_2 \cdot v_R) - a_f(\Delta\theta + b_f\theta);$$

$$V_{RR}=a_r(v_3-\beta_r v_3 \cdot v_p + \tau_1 v_3 \cdot v_R) + a_r(\Delta\theta + b_r\theta); \text{ and}$$

$$V_{RL}=a_r(V_4-\beta_r v_4 \cdot v_p - \tau_r v_4 \cdot v_R) - a_r(\Delta\theta + b_r\theta).$$

In the control equation described above, $V_{FR}$ denotes a right front tire wheel, $V_{FL}$ denotes a left front tire wheel, $V_{RR}$ denotes a right rear tire wheel, and $V_{RL}$ denotes a left rear tire wheel. However, these symbols can be simply replaced with the control signal V unless otherwise specified herein.

In addition, $v_1$ denotes a sprung mass vertical velocity at the right front tire wheel, $v_2$ denotes a sprung mass vertical velocity at the left front tire wheel, $v_3$ denotes a sprung mass vertical velocity at the right rear tire wheel, $v_4$ denotes a sprung mass vertical velocity at the left rear tire wheel, $v_p$ denotes a pitch rate, $v_R$ denotes a roll rate, $\Delta\theta$ denotes the steering angular velocity, and $\theta$ denotes the steering angular displacement.

Furthermore, the pitch rate $v_p$ is calculated according to an average velocity difference between the front and rear tire wheels, and the roll rate $v_R$ denotes an average velocity between the right and left tire wheels. These rates can be derived using the following equations.

$$v_p=(v_1+v_2-v_3-v_4)/2$$

$$v_R=(v_1+v_3-v_2-v_4)/2$$

Referring back to FIG. 13, at a step 105, the CPU 4b determines whether an absolute value of the derived control signal V is larger than a predetermined threshold value $\delta$.

If Yes in the step 105, the routine goes to a step 106. If No in the step 105, the routine goes to a step 107.

At the step 106, the CPU 4b determines whether the control signal V indicates a positive. If Yes in the step 106, the routine goes to a step 108. If No in the step 106, the routine goes to a step 109.

At the step 107, the CPU 4b drives the drive circuit to issue an operation signal to the pulse motor 3 to control the shock absorber SA to provide the soft characteristic SS.

At the step 108, the CPU 4b drives the drive circuit 4c to issue an operation signal to the pulse motor 3 to control the shock absorber to provide the extension stroke side hard characteristic HS. It is noted that the damping coefficient at the extension stroke side, at this time of step 108, is made in proportion to a magnitude of the control signal V.

At the step 109, the CPU 4b drives the drive circuit 4c to issue an operation signal to the pulse motor 3 to control the shock absorber SA to provide the compression stroke side hard characteristic SH. It is noted that the damping coefficient at the compression stroke side, at the time of step 109, is made in proportion to the magnitude of the control signal V.

At the step 110, the CPU 4b determines whether the flag F=1. If Yes at the step 110, the routine goes to a step 111. If No at the step 110, the routine goes to a step 114.

At the step 111, the CPU 4b starts a timer to measure a time t.

At a step 112, the CPU 4b determines whether the measured time t reaches a predetermined time duration $T_0$. If Yes at the step 112, the routine goes to a step 113. If No at the step 112, the routine goes to the step 104.

At the step 113, the CPU 4b sets the flag F=0.

At the step 114, the CPU 4b derives the control signal V when the steering condition is not established (OFF). In this case, the coefficients in the above control equation are set such that $\alpha_f = \alpha_f$, $\alpha_r = \alpha_r$, and $a_f = a_r = 0$.

Next, an action of the preferred embodiment so described above will be explained below.

a) When the steering condition is not established (OFF):

When the vehicle runs approximately on a straight road or the vehicle turns on a constant radius circle (steady state turn), a product between the steering angle $\theta$ and steering angular velocity $\Delta\theta$ is relatively small so that the steering condition defined at the step 102 is not established.

In this case, at the step 114, the control signal V is calculated provided that the coefficients in the control equation be set as $\alpha_f = \alpha_f$, $\alpha_r = \alpha_r$, and $a_f = a_r = 0$. In this case, a correction term related to the steering angle indicates 0 so that the damping coefficient of the shock absorber SA is controlled on the basis of the sprung mass vertical velocity v, pitch rate $v_p$, and roll rate $v_R$.

Such an operating state as in the case of no establishment of the steering condition will be described below with reference to a timing chart shown in FIGS. 17 (A) through 17 (D).

FIG. 17 (A) shows a timing chart of the control signal V (which mainly corresponds to the sprung mass vertical velocity v).

FIG. 17 (B) shows a timing chart of the damping force F and relative velocity between the sprung mass and unsprung mass velocities.

FIG. 17 (C) shows a timing chart of the control direction of the shock absorber SA.

FIG. 17 (D) shows a timing chart of the operation signal (damping coefficient) issued to the pulse motor 3.

As shown in FIGS. 17 (A) through 17 (D), when the absolute value of the control signal V does not exceed the predetermined threshold value $\delta$, the damping force characteristic is controlled in the soft characteristic SS. If the absolute value thereof exceeds the threshold value $\delta$, the damping force characteristic is such as the extension stroke side hard characteristic HS provided that the control signal V indicates the positive sign. On the contrary, if the control signal V indicates a negative sign, the damping force characteristic is such as the compression side hard characteristic SH. Furthermore, according to the magnitude of the control signal V, the damping coefficient is controlled.

As described above, in the embodiment, the damping force characteristic is exchanged on the basis of the sign of the control signal V. However, as shown in FIGS. 17 (A) through 17 (D), when the sign of the control signal (approximately corresponds to the sprung mass vertical velocity v) is coincident with the relative velocity, i.e., the damping force generated in the shock absorber SA is acted upon the direction toward which the vibration is controlled, the direction toward which the piston is stroked is controlled to provide the high damping coefficient. On the contrary, when the signs between the control signal V and relative velocity do not coincide with each other, i.e., when the damping force acts upon the direction of the application of vibration, the direction toward which the piston is stroked is controlled at the low damping coefficient (that is to say, using the "Sky Hook" theory) so as to suppress the road surface input to the vehicle body and to provide a superior vehicular comfort.

Referring back to FIGS. 17 (A) through 17 (D), as will be appreciated from a case wherein the first direction of control for the shock absorber SA is changed from the compression stroke side soft characteristic to the extension stroke side hard characteristic, it is not necessary to change the damping force characteristic when the control direction of the shock absorber SA is switched from the compression stroke side soft to the extension stroke side hard when the control is carried out to set the control to the compression stroke side soft provided that the extension stroke side hard characteristic is already changed thereto.

Hence, an operation response characteristic and durability can be improved.

b) When the steering condition is established (ON) ($|\theta\cdot\Delta\theta| > K$, wherein K denotes a constant):

When the vehicle tries to change its running traffic lane to another lane or the vehicle takes a slalom action, the value of the product between the steering angle $\theta$ and steering angular velocity $\Delta\theta$ should be larger so that the steering condition defined at the step 102 is established (ON).

In this case, as the step 104 is done, the coefficients in the control equation are such that $\alpha_f = \alpha_r = 0$, $a_f = a_f$, and $a_r = a_r$ and the control equation is calculated to derive the control signal V.

In this case, a term related to the sprung mass vertical velocity indicates 0 and the damping coefficient of the shock absorber SA is controlled on the basis of the steering angular velocity $\Delta\theta$ and steering angular displacement $\theta$.

FIGS. 18 (A) and 18 (B) show a integrally illustrated timing chart when the above described steering condition is established.

FIG. 18 (A) shows the timing chart of the steering angular displacement $\theta$ (solid line) and steering angular velocity $\Delta\theta$ (dot-and-dash line).

FIG. 18 (B) shows the timing chart of the control signal V when the steering condition is established (solid line) and V' when the steering condition is not established (so called Sky Hook control).

In details, a frequency of rolling direction generated during the steering operation at the time when the vehicle has changed its running traffic lane to another lane and when the vehicle takes the slalom motion is much lower in its frequency band than the frequencies such as of sprung mass resonance, and rolling resonance, while the steering angle $\theta$ and the steering angular velocity $\Delta\theta$ are proportional to a rolling angle and roll rate.

Hence, since the damping force control is carried out according to a control switching line during the steering operation shown in FIG. 19 its control is such as to control toward the high damping coefficient in proportion to the rolling angle and roll rate so that the roll angle can be reduced.

FIG. 20 shows a Lissajous's Figure waveform of the damping force in the case where the control during the steering operation is executed in the preferred embodiment.

As shown in FIG. 20, a spring constant of each suspension unit can be increased and the increased spring constant permits the rolling angle to be reduced. In FIG. 20, a broken line denotes the case where the control signal is proportional to only the steering angular velocity. In the case of the broken line of FIG. 20, the spring constant remains unchanged.

In the preferred embodiment, each suspension unit is controlled to provide the extension hard characteristic HS, compression stroke side hard characteristic SH, and soft characteristic SS.

However, a suspension unit that changes the damping force characteristics at both extension and compression stroke sides from the soft to the hard and vice verse may be used. In the alternative case, the relative velocity is needed to be detected when the suppression of vibration is controlled.

The control equation is not limited to the above-described equation. The pitch rate and/or roll rate in the terms related to the sprung mass vertical speed v may be omitted.

In the embodiment, when the steering condition is established (ON), the terms related to the sprung mass vertical velocity are zeroed to derive the control signal V. However, it is not always necessary to control the damping force with those terms zeroed.

As described hereinabove, the vehicular damping force controlling system according to the present invention, derives the control signal on the basis of the steering angular displacement, steering angular velocity, and a signal derived from sprung mass behavior detecting means such as the G sensor and the derived control signal. The control signal is then used to control the damping force characteristic of each shock absorber SA. Thus, the damping force characteristic for each suspension unit is controlled so as to provide the vibration damping force in the roll direction on the basis of the steering ankle and steering angular velocity which are approximately in the same phase as the roll angle and roll rate so that the controlled damping force is acted upon so as to increase the spring constant of each suspension unit and reduce the roll angle.

In addition, since in a case where each shock absorber SA is so constructed as to provide a high damping force characteristic at either of the stroke sides, the other stroke side is fixed to the predetermined low damping force characteristic. Thus, when a state wherein one of the stroke sides in which the generated damping force is acted upon the direction of vibration suppression is in the high damping force characteristic so as to increase the vibration controlling force is transferred to a state wherein the generated damping force is acted upon the application direction of the vibration to the vehicle body, the other stroke side is in the low damping force characteristic without exchange in the damping force characteristic so that the application force of the vibration is weakened. Thus, a simple control permits the high response characteristic and high durability of each suspension unit (shock absorber (SA).

The foregoing description has been made in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling damping forces for respective shock absorbers of a vehicle, comprising:
   a) a plurality of shock absorbers, each shock absorber being interposed between a sprung mass and an unsprung mass of the vehicle;
   b) first means for varying a damping force characteristic of at least one side of a piston stroke of each shock absorber in response to a control signal;
   c) second means for detecting a behavior of the sprung mass of the vehicle;
   d) third means for detecting a steering angular displacement and a steering angular velocity of a vehicular steering system; and
   e) fourth means for receiving a first signal indicating the steering angular displacement and a second signal indicating the steering angular velocity from said third means and a third signal indicating the sprung mass behavior detected by said second means and producing the control signal derived using values of the first, second, and third signals, said control signal being transmitted to said first means so that the damping force characteristic of each shock absorber is controlled according to the control signal:
   wherein each shock absorber has an extension stroke side and a compression stroke side with respect to the piston and each shock absorber is so constructed as to form three modes of control: a first control mode to provide an extension stroke side hard characteristic such that the damping force characteristic is variable at the extension stroke side and that at the compression stroke side is fixed to a predetermined low damping force characteristic; a second control mode to provide a compression stroke side hard characteristic such that the damping force characteristic at the compression stroke side is variable and that at the extension stroke side is fixed to the predetermined low damping force characteristic; and a third control mode to provide a soft characteristic such that the damping force characteristics at both extension and compression stroke sides are fixed to the predetermined low damping force characteristics; and
   wherein, when a value of the control signal is a positive value and exceeds a predetermined threshold value ($\delta$), said fourth means produces the control signal to the first means so that at least the corresponding shock absorber is controlled to provide the extension stroke side hard characteristic, when the value of the control signal is within a plus and minus threshold value ($\pm\delta$), said fourth means produces the control signal to the first means so that the corresponding shock absorber is controlled to provide the soft characteristic, and when the value of the control signal is lower than the minus predetermined threshold value ($-\delta$), the fourth means produces the control signal to the first means so that the corresponding shock absorber is controlled to provide the compression stroke side hard characteristic.

2. A system for controlling damping forces for respective shock absorbers of a vehicle as set forth in claim 1, wherein said fourth means derives the control signal such that when a predetermined steering condition is not established (OFF), the control signal is derived on the basis of said third signal from said second means and when the predetermined steering condition is established (ON), the control signal is derived using at least said first and second signals from said third means.

3. A system for controlling damping forces for respective shock absorbers of a vehicle as set forth in claim 2, wherein the control signal V is derived using the following control equations for each shock absorber:

$$V_{FR} = \alpha_f(v_1 + \beta_f v_1 \cdot v_p + \tau_f v_1 + \tau_f v_1 \cdot v_R) + a_f(\Delta\theta + b_f\theta);$$

$$V_{FL} = \alpha_f(v_2 + \beta_f v_2 \cdot v_p - \tau_f v_2 \cdot v_R) - a_f(\Delta\theta + b_f\theta);$$

$$V_{RR} = \alpha_r(v_3 - \beta_r v_3 \cdot v_p + \tau_1 v_3 \cdot v_R) + a_r(\Delta\theta + b_r\theta); \text{ and}$$

$$V_{RL} = \alpha_r(v_4 - \beta_r v_4 \cdot v_p - \tau_r V_4 \cdot v_R) - a_r(\Delta\theta + b_r\theta);$$

wherein in the control equations described above, $V_{FR}$ denotes a control signal for the right front tire wheel, $V_{FL}$ denotes a control signal for the left front tire wheel, $V_{RR}$ denotes a control signal for the right rear tire wheel, $V_{RL}$ denotes a control signal for the left rear tire wheel, $v_1$ denotes a sprung mass vertical velocity at the right rear tire wheel, $v_2$ denotes a sprung mass vertical velocity at the left front tire wheel, $v_3$ denotes a sprung mass vertical velocity at the right rear tire wheel, $v_4$ denotes a sprung mass vertical velocity at the left rear tire wheel, $v_p$ denotes a pitch rate, $v_R$ denotes a roll rate, $\Delta\theta$ denotes the steering angular velocity, and $\theta$ denotes the steering angular displacement, and, furthermore, the pitch rate $v_p$ is calculated according to an average velocity difference between the front and rear tire wheels, and the roll rate $v_R$ denotes an average velocity between the right and left tire wheels, the rates $v_p$ and $v_R$ being derived using the following equations:

$$v_p = (v_1 + v_2 - v_3 - v_4)/2$$

$$v_R = (v_1 + v_3 - v_2 - v_4)/2.$$

4. A system for controlling damping forces for respective shock absorbers of a vehicle as set forth in claim 3, wherein when the predetermined steering condition is not established (OFF), $a_f = a_r = 0$, and when the predetermined steering condition is established (ON), $\alpha_f = \alpha_r = 0$.

5. A system for controlling damping forces for respective shock absorbers of a vehicle as set forth in claim 4, wherein said third means comprises a vertical G sensor for each shock absorber installed at a position of a body of the vehicle to detect the vertical sprung mass velocity.

6. A system for controlling damping forces for respective shock absorbers of a vehicle as set forth in claim 4, wherein said predetermined steering condition is as follows: $|\theta \cdot \Delta\theta| > K$, wherein K denotes a constant.

7. A method for controlling a damping force characteristic for at least one of a plurality of respectively arranged shock absorbers of a vehicle, comprising the steps of:

a) providing a plurality of shock absorbers each having an extension stroke side and a compression stroke side with respect to a piston of the shock absorber, each shock absorber having three modes of control, including:

a first control mode to provide an extension stroke side hard characteristic such that the damping force characteristic is variable at the extension stroke side and that at the compression stroke side is fixed to a predetermined low damping force characteristic;

a second mode to control a compression stroke side hard characteristic such that the damping force characteristic at the compression stroke side is variable and at the extension stroke side is fixed to the predetermined low damping force characteristic; and a third control mode to provide a soft characteristic such that the damping force characteristics at both extension and compression stroke sides are fixed to the predetermined low damping force characteristic;

b) varying a damping force characteristic of at least one side of the piston stroke of each shock absorber in response to a control signal input thereto;

c) detecting a behavior of a sprung mass of the vehicle;

d) detecting a steering angular displacement and a steering angular velocity of a steering system of the vehicle;

e) receiving a first signal indicating the steering angular displacement, a second signal indicating the steering angular velocity, and a third signal indicating the sprung mass behavior;

f) producing the control signal using values of the first, second, and third signals;

g) transmitting said control signal to said at least one shock absorber so that the damping force characteristic of the shock absorber is controlled according to the control signal;

h) controlling the damping force characteristic of the at least one shock absorber so that when a value of the control signal is a positive value and exceeds a predetermined threshold value ($\delta$) the shock absorber is controlled according to the first control mode, when the value of the control signal is within a plus and minus threshold value ($\pm\delta$) the shock absorber is controlled according to the third control mode, and when the value of the control signal is lower than the minus predetermined threshold value ($-\delta$) the shock absorber is controlled according to the second control mode.

* * * * *